United States Patent
Ichikawa et al.

(10) Patent No.: US 6,473,144 B1
(45) Date of Patent: *Oct. 29, 2002

(54) LIQUID CRYSTAL DISPLAY APPARATUS AND LIQUID CRYSTAL PROJECTION DISPLAY APPARATUS WHICH EMPLOY HOLOGRAM COLOR FILTER

(75) Inventors: Nobuhiko Ichikawa, Tokyo (JP); Tsuyoshi Hotta, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/965,047

(22) Filed: Nov. 5, 1997

Related U.S. Application Data

(63) Continuation of application No. 08/500,757, filed on Jul. 11, 1995, now Pat. No. 5,737,040.

(30) Foreign Application Priority Data

| Jul. 12, 1994 | (JP) | 6-159767 |
| Jan. 12, 1995 | (JP) | 7-3050 |
| Jan. 12, 1995 | (JP) | 7-3051 |

(51) Int. Cl.$^7$ .................................... F02F 1/1335
(52) U.S. Cl. ................... 349/106; 349/104; 359/15
(58) Field of Search ................ 349/9, 79, 96, 349/106, 109; 359/1, 15

(56) References Cited

U.S. PATENT DOCUMENTS

| 4,067,638 A | 1/1978 | Yano et al. |
| 4,421,380 A | 12/1983 | McGrew |
| 4,807,978 A | 2/1989 | Grinberg et al. |
| 4,983,016 A | 1/1991 | Yamamoto |
| 5,018,835 A | 5/1991 | Dorschner |
| 5,078,239 A | 1/1992 | Toyono et al. |
| 5,103,323 A | 4/1992 | Magarinos et al. |
| 5,103,325 A | 4/1992 | Andrews et al. |
| 5,161,042 A | 11/1992 | Hamada |
| 5,198,911 A | 3/1993 | Ning |
| 5,267,060 A | 11/1993 | Colton |
| 5,355,188 A | 10/1994 | Biles et al. |
| 5,486,934 A | 1/1996 | Huang |
| 5,506,701 A | 4/1996 | Ichikawa |
| 5,510,913 A | 4/1996 | Hashimoto et al. |

FOREIGN PATENT DOCUMENTS

| JP | 05-232319 | 9/1993 |
| JP | 07-98454 | 4/1995 |

*Primary Examiner*—Toan Ton
(74) *Attorney, Agent, or Firm*—Sughrue Mion, PLLC

(57) ABSTRACT

A liquid crystal display apparatus and liquid crystal projection display apparatus, which employ a hologram color filter, and which are designed so that the illuminating light utilization efficiency is improved to a considerable extent, and that a color image can be faithfully displayed with excellent color reproducibility without uneven color or other similar problem. A color liquid crystal display apparatus (11) has a hologram (5), which diffractively disperses incident light so as to emanate light rays in different wavelength regions at a predetermined spatial period, as a color filter, and a liquid crystal display device (6). The display apparatus (11) is illuminated by white parallel back light (3) from an illuminator (14). A displayed image which is modulated in the color liquid crystal display apparatus (11) is passed through a field lens, which is disposed in the vicinity of the display apparatus (11), and formed as an enlarged image on a screen (19) for display through a projection lens (18). A short-wavelength cut-off filter whose transmittance for a wavelength not longer than 430 nm is not higher than 5% is disposed at a position in an optical path extending from a lamp (15) to the screen (19), thereby preventing crosstalk of colors which might otherwise occur when light which should be incident on a pixel assigned to display blue undesirably enters a pixel which is adjacent to the pixel for blue, and thus making it possible to display a faithful color image.

10 Claims, 12 Drawing Sheets

LIQUID CRYSTAL DISPLAY APPARATUS AND LIQUID CRYSTAL PROJECTION DISPLAY APPARATUS WHICH EMPLOY HOLOGRAM COLOR FILTER

This is a continuation of application Ser. No. 08/500,757 filed Jul. 11, 1995, now U.S. Pat. No. 5,737,040.

BACKGROUND OF THE INVENTION

The present invention relates to a liquid crystal display apparatus and a liquid crystal projection display apparatus, which employ a hologram color filter. More particularly, the present invention relates to a liquid crystal display apparatus and liquid crystal projection display apparatus, which are designed so that the illuminating light utilization efficiency is improved to a considerable extent, and that a color image can be faithfully displayed with excellent color reproducibility without uneven color or other similar problem.

In conventional color liquid crystal display apparatuses that employ an absorption color filter formed by using pigments, dyes, etc., back light for display is indispensably needed. However, when white light is merely applied to a color liquid crystal display apparatus from the rear thereof, the light utilization efficiency is exceedingly low. Main reasons therefor are as follows:

① The black matrix, which is a region of the color filter other than cells of each color, occupies a relatively wide area, and light that strikes on the black matrix is wasted.

② In white light that is incident on each pixel, color components passing through color filter cells of R (red), G (green) and B (blue) are limited; therefore, other complementary color components are wasted.

③ There is a loss of light due to absorption in the color filter.

FIG. 15 shows a conventionally known method designed to solve these problems. A microlens array 2, for example, is installed in front of a color filter 1, and white back light 3 is converged on each of color filter cells R, G and B, thereby raising the utilization efficiency of the back light 3. It should be noted that, in FIG. 15, reference numeral 4 denotes a black matrix which is provided to lie between the color filter cells R, G and B.

However, even if this method is adopted, the white light 3 cannot dispersedly be applied to each of the color filter cells R, G and B. Therefore, the above-described problem ② still remains unsolved.

Japanese Patent Unexamined Publication (KOKAI) No. 4-60538 proposes a liquid crystal projector in which the light utilization efficiency is improved by using three dichroic mirrors and a microlens array without employing a color filter such as that described above. In this case, there is no need for an absorption color filter, which is formed by using pigments, dyes, etc., as in the above-described arrangement. Accordingly, the above problems ① to ③ are solved, and thus the brightness of the color image increases. However, since three dichroic mirrors are required, the optical system and the display apparatus increase in size and become bulky. Further, the cost also increases.

In view of these circumstances, the present applicant has proposed a liquid crystal display apparatus in which a color filter that makes use of hologram is employed in order to markedly improve the utilization efficiency of illuminating light, for example, back light for liquid crystal display (for example, see Japanese Patent Application No. 5-12170).

Further, the present applicant has proposed a liquid crystal projection display apparatus in which the above-described liquid crystal display apparatus that employs a hologram color filter is transformed into a projection type display apparatus to display a bright color image on a screen (for example, see Japanese Patent Application NO. 5-242292).

However, it has been found that, when a liquid crystal display apparatus that employs a hologram color filter as described above is used as a projection apparatus, a part of light that is diffracted by the hologram color filter may enter not a liquid crystal cell for displaying the corresponding color but a liquid crystal cell for displaying another color, which is adjacent to the desired cell, and there is therefore likelihood that a color image displayed on the liquid crystal display apparatus will not be projected with faithful color reproduction.

It has also been found that, since light rays that are diffractively dispersed by the hologram color filter enter the liquid crystal display apparatus at different angles according to their wavelength and emanate therefrom at different angles, if these light rays are projected simply by using a projection lens, different colors are undesirably put on the left and right peripheral portions of the screen.

Further, studies should be carried out on the following matters: conditions for the parallelism of back light which are demanded for such a liquid crystal projection display apparatus employing a hologram color filter to display a color image with excellent color reproduction; the positional relationship between the hologram color filter and the polarizer of the liquid crystal display apparatus which is required to reproduce an image clearly and faithfully; and the structure of a hologram comprising uniform interference fringes whereby a higher back light utilization efficiency is provided.

SUMMARY OF THE INVENTION

In view of the above-described circumstances, an object of the present invention is to provide a liquid crystal display apparatus and liquid crystal projection display apparatus which employ a hologram color filter, and which are designed so that the illuminating light utilization efficiency is improved to a considerable extent, and that a color image can be faithfully displayed with excellent color reproducibility without uneven color or other similar problem.

To attain the above-described object, the present invention provides a liquid crystal display apparatus in which a hologram which diffractively disperses incident light so as to emanate light rays in different wavelength regions at a predetermined spatial period is used as a color filter for a color liquid crystal display device, and a cut-off filter whose transmittance for light in a desired wavelength region is not higher than 5% is disposed in an optical path which extends from a light source to an observation position.

In addition, the present invention provides a first liquid crystal projection display apparatus which employs a hologram color filter, and in which an image displayed on a color liquid crystal display device is projected on a screen as an enlarged image by a projection optical system. In the projection display apparatus, a hologram which diffractively disperses incident light so as to emanate light rays in different wavelength regions at a predetermined spatial period is used as a color filter for the color liquid crystal display device, and a cut-off filter whose transmittance for light in a desired wavelength region is not higher than 5% is disposed in an optical path which extends from a light source to the screen.

In this case, it is preferable to dispose any of the following cut-off filters in the optical path extending from the light source to the screen: a short-wavelength cut-off filter whose transmittance for a wavelength not longer than 430 nm is not higher than 5%; a long-wavelength cut-off filter whose transmittance for a wavelength not shorter than 660 nm is not higher than 5%; a band cut-off filter whose transmittance for a wavelength in the range of from 490 nm to 510 nm is not higher than 5%; and a band cut-off filter whose transmittance for a wavelength in the range of from 570 nm to 590 nm is not higher than 5%.

It should be noted that a hologram type reflection filter may be used as either of the above band cut-off filters.

It is preferable to dispose the hologram at a position which is closer to the light source than a polarizer which is provided at the entrance side of the color liquid crystal display device.

Further, illuminating light for the hologram preferably has such a degree of parallelism that a component of the light which is at an angle within ±6° with respect to the travel direction of the illuminating light accounts for not less than 80%.

The dispersion angle of the hologram is preferably within ±15°.

It is preferable for the hologram to have both a dispersing function and a converging function or only a dispersing function. In the latter case, the color liquid crystal display device is preferably provided with a converging optical element in combination with the hologram. In the latter case, a hologram comprising a blazed holographic diffraction grating may be used as a hologram having a dispersing function.

In addition, the present invention provides a second liquid crystal projection display apparatus which employs a hologram color filter, and in which an image displayed on a color liquid crystal display device is projected on a screen as an enlarged image by a projection optical system. In the projection display apparatus, a hologram which diffractively disperses incident light so as to emanate light rays in different wavelength regions at a predetermined spatial period is used as a color filter for the color liquid crystal display device, and a field lens is disposed in the vicinity of the exit side of the color liquid crystal display device.

In this case, the dispersion angle of the hologram is preferably within ±15°.

It is preferable for the hologram to have both a dispersing function and a converging function or only a dispersing function. In the latter case, the color liquid crystal display device is preferably provided with a converging optical element in combination with the hologram. In the latter case, a hologram comprising a blazed holographic diffraction grating may be used as a hologram having a dispersing function.

The field lens is preferably a Fresnel lens.

Further, it is preferable to dispose a cut-off filter whose transmittance for light in a desired wavelength region is not higher than 5% in an optical path which extends from a light source to the screen. More specifically, it is preferable to dispose any of the following cut-off filters: a short-wavelength cut-off filter whose transmittance for a wavelength not longer than 430 nm is not higher than 5%; a long-wavelength cut-off filter whose transmittance for a wavelength not shorter than 660 nm is not higher than 5%; a band cut-off filter whose transmittance for a wavelength in the range of from 490 nm to 510 nm is not higher than 5%; and a band cut-off filter whose transmittance for a wavelength in the range of from 570 nm to 590 nm is not higher than 5%. It should be noted that a hologram type reflection filter may be used as either of the above band cut-off filters.

It is preferable to dispose the hologram at a position which is closer to the light source than a polarizer which is provided at the entrance side of the color liquid crystal display device.

Further, illuminating light for the hologram preferably has such a degree of parallelism that a component of the light which is at an angle within ±6° with respect to the travel direction of the illuminating light accounts for not less than 80%.

In addition, the present invention provides a liquid crystal display apparatus employing a hologram color filter. The liquid crystal display apparatus has a liquid crystal panel in which liquid crystal cells for displaying pixel information of different colors are periodically arranged, and in which the transmission condition of each liquid crystal cell is controlled independently of each other. The liquid crystal display apparatus further has a color filter which is integrally bonded to the illuminating light entrance side of the liquid crystal panel. The color filter comprises a single hologram which diffractively disperses incident illuminating light so that light rays in different wavelength regions enter respective liquid crystal cells of corresponding colors.

In this case, it is preferable for the hologram color filter to be integrally bonded to the illuminating light entrance side of a transparent substrate.

In addition, the present invention provides a liquid crystal display apparatus employing a hologram color filter. The liquid crystal display apparatus has a liquid crystal panel in which liquid crystal cells for displaying pixel information of different colors are periodically arranged, and in which the transmission condition of each liquid crystal cell is controlled independently of each other. The liquid crystal display apparatus further has a color filter which is integrally bonded to the illuminating light entrance side of the liquid crystal panel. The color filter comprises a stack of holograms or a multi-recorded hologram which diffractively disperses incident illuminating light so that light rays in different wavelength regions enter respective liquid crystal cells of corresponding colors.

In these liquid crystal display apparatuses, it is preferable that an anti-reflection layer for preventing surface reflection should be provided on the illuminating light entrance side of the hologram color filter. It is also possible to provide a prism for preventing surface reflection on the illuminating light entrance side of the hologram color filter.

Further, a polarizer for converting illuminating light into linearly polarized light may be provided on the illuminating light entrance side of the hologram color filter. In this case, however, it is preferable to arrange the polarizer so that the direction of linearly polarized light from the polarizer is normal to the illuminating light entrance surface of the hologram color filter, that is, s-polarized light is incident on the hologram color filter.

It should be noted that these liquid crystal display apparatuses can be used as a liquid crystal display apparatus for a color liquid crystal projector.

In the liquid crystal display apparatus employing a hologram color filter and the first liquid crystal projection display apparatus employing a hologram color filter according to the present invention, a hologram which diffractively disperses incident light so as to emanate light rays in different wavelength regions at a predetermined spatial period is used as a color filter for a color liquid crystal display device, and a cut-off filter whose transmittance for light in a desired wavelength region is not higher than 5% is disposed in an optical path which extends from a light source to an observation position or to the screen. Therefore, the illuminating light utilization efficiency in the projection apparatus can be improved to a considerable extent, and it is possible to prevent crosstalk of colors, e.g. blue and red, and to display or project a color image faithfully with excellent color reproducibility.

In the second liquid crystal projection display apparatus employing a hologram color filter according to the present invention, a hologram which diffractively disperses incident light so as to emanate light rays in different wavelength regions at a predetermined spatial period is used as a color filter for a color liquid crystal display device, and a field lens is disposed in the vicinity of the exit side of the color liquid crystal display device. Therefore, the illuminating light utilization efficiency in the projection apparatus can be improved to a considerable extent, and it is possible to project a color image faithfully with excellent color reproducibility without uneven color or other similar problem.

In another liquid crystal display apparatus employing a hologram color filter according to the present invention, a liquid crystal panel in which liquid crystal cells for displaying pixel information of different colors are periodically arranged, and in which the transmission condition of each liquid crystal cell is controlled independently of each other is prepared. In addition, a color filter is prepared separately from the liquid crystal panel. The color filter comprises a single hologram array or a stack of hologram arrays or a multi-recorded hologram array which diffractively disperses incident illuminating light so that light rays in different wavelength regions enter respective liquid crystal cells of corresponding colors. The hologram color filter is integrally bonded to the illuminating light entrance side of the liquid crystal panel. Accordingly, it is possible to produce a liquid crystal display apparatus employing a hologram color filter without modifying the existing liquid crystal display apparatus manufacturing process to a considerable extent. It should be noted that, since the hologram color filter need not flow through the liquid crystal panel producing process with the hologram layer thereof being incorporated therein, there is no likelihood of the hologram color filter being exposed to high temperature and thus deteriorated.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
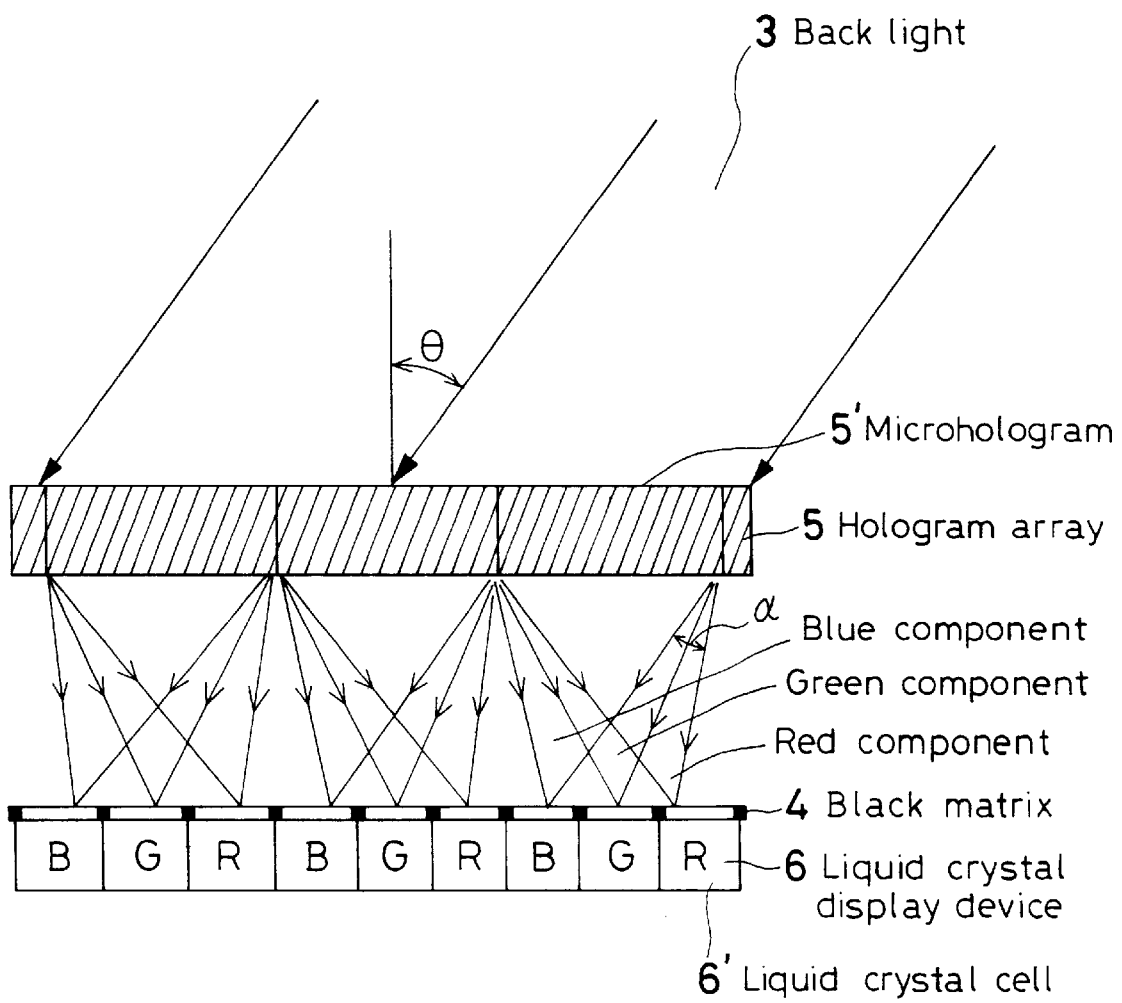
FIG. 1 is a sectional view of a liquid crystal display apparatus incorporating a first form of hologram color filter used in the present invention.

The liquid crystal display apparatus and liquid crystal projection display apparatus, which employ a hologram color filter, according to the present invention will be described below by way of embodiments and with reference to the accompanying drawings.

First of all, a first liquid crystal display apparatus which is employed in the present invention will be explained with reference to the sectional view of FIG. 1. As shown the figure, a hologram array 5, which constitutes a first form of color filter in the present invention, is disposed at the back light (3) entrance side of a liquid crystal display device 6 at a distance from it. The liquid crystal display device 6 is regularly divided into liquid crystal cells 6' (pixels). A color filter 1, which includes a black matrix 4, or the black matrix 4 alone is disposed on the back of the liquid crystal display device 6. The color filter 1 comprises colored cells 1' of R, G and B which are aligned with the liquid crystal cells 6', respectively, and the black matrix 4 which lies between the liquid crystal cells 6'. In addition, polarizers (not shown) are disposed on both sides, respectively, of the liquid crystal display device 6.

The pixels (liquid crystal cells 6') of the liquid crystal display device 6 are divided into groups of three different color pixels of R, G and B. The hologram array comprises microholograms 5' which are arranged in the form of an array at the same pitch as the repeating pitch of the groups of three different color pixels such that each microhologram 5' corresponds to one group of three liquid crystal cells 6' which are adjacent to each other in the direction of the plane of the figure. That is, each microhologram 5' is aligned with one group of three liquid crystal cells 6' of the liquid crystal display device 6 which are adjacent to each other in the direction of the plane of the figure. Each microhologram 5' is formed in a Fresnel zone plate shape so that a green light component in the back light 3, which is incident on the hologram array 5 at an angle θ with respect to the line normal to the hologram array 5, is converged on the liquid crystal cell G in the center of the group of three different color pixels R, G and B corresponding to the microhologram 5'. Further, each microhologram 5' comprises a transmission hologram, e.g. a relief type hologram, a phase type hologram, an amplitude type hologram, etc., which has no or only slight dependence of diffraction efficiency on wavelength. The expression "hologram which has no or only slight dependence of diffraction efficiency on wavelength" herein means a hologram which diffracts any wavelength by a single diffraction grating, and not a hologram of the type which diffracts only a specific wavelength, such as a Lippmann hologram. The diffraction grating that has only slight dependence of diffraction efficiency on wavelength diffracts light at an angle of diffraction which varies according to wavelength.

By virtue of the above-described arrangement, when white back light 3 is incident on the surface of the hologram array 5 on the side thereof which is remote from the liquid crystal display device 6 at an angle θ with respect to the line normal to the hologram array surface, the angle of diffraction caused by each microhologram 5' varies depending upon wavelength. Consequently, converging positions for various wavelengths are dispersed in a direction parallel to the surface of the hologram array 5. The hologram array 5 is arranged and disposed so that, among the diffracted light rays, the red light component is converged on the position of the liquid crystal cell R that displays red, while the green light component is converged on the position of the liquid crystal cell G that displays green, and the blue light component is converged on the position of the liquid crystal cell B that displays blue. Thus, each color component passes through the corresponding liquid crystal cell 6' with substantially no attenuation in the black matrix 4, thereby enabling color display according to the state of the corresponding liquid crystal cell 6'. It should be noted that the incident angle θ of the back light 3 on the hologram array 5 is determined by various conditions such as hologram recording conditions, the thickness of the hologram array 5, and the distance between the hologram array 5 and the liquid crystal display device 6.

Thus, by using the hologram array 5 as a color filter, each wavelength component of back light for the conventional color filter can be made incident on each liquid crystal cell 6' without being wasted or absorbed. Accordingly, the back light utilization efficiency can be improved to a considerable extent.

Next, a second liquid crystal display apparatus which is employed in the present invention will be explained with reference to the sectional view of FIG. 2, which is similar to FIG. 1. As shown in the figure, a color filter 10, which is arranged in a second form of color filter used in the present invention, is disposed at the back light (3) entrance side of a liquid crystal display device 6 at a distance from it. The liquid crystal display device 6 is regularly divided into liquid crystal cells 6' (pixels). A black matrix 4 is disposed on the back of the liquid crystal display device 6. The black matrix 4 is provided to lie between the liquid crystal cells 6'. In addition, polarizers (not shown) are disposed on both sides, respectively, of the liquid crystal display device 6.

The color filter 10 comprises a hologram 7 and a microlens array 8 which is composed of microlenses 8'. The microlenses 8' are arranged in the form of an array at the same pitch as the repeating pitch of the groups of three different color pixels R, G and B such that each microlens 8' corresponds to one group of three liquid crystal cells 6' of the liquid crystal display device 6 which are adjacent to each other in the direction of the plane of the figure. The hologram 7 is a transmission hologram, e.g. a relief type hologram, a phase type hologram, an amplitude type hologram, etc., which comprises uniform interference fringes that function as a diffraction grating, and which has no or only slight dependence of diffraction efficiency on wavelength.

By virtue of the above-described arrangement, when back light 3 is incident on the surface of the hologram 7 on the side thereof which is remote from the liquid crystal display device 6 at an angle θ with respect to the line normal to the hologram surface, the incident light 3 is diffracted and an angle which varies depending upon wavelength, and dispersed toward the exit side of the hologram 7. The dispersed light is converged on the focal plane of each microlens 8', which is disposed on the entrance or exit site of the hologram 7, while being separated for each wavelength. The color filter 10 is arranged and disposed that, among the light rays, the red light component is converged on the position of the liquid crystal cell R that displays red, while the green light component is converged on the position of the liquid crystal cell G that displays green, and the blue light component is converged on the position of the liquid crystal cell B that displays blue. Thus, each color component passes through the corresponding liquid crystal cell 6' with substantially no attenuation in the black matrix 4, thereby enabling color display according to the state of the corresponding liquid crystal cell 6'. It should be noted that the incident angle θ of the back light 3 on the hologram 7 is determined by various conditions such as hologram recording conditions, the thickness of the hologram 7, and the distance between the hologram 7 and the liquid crystal display device 6.

Figure 15:
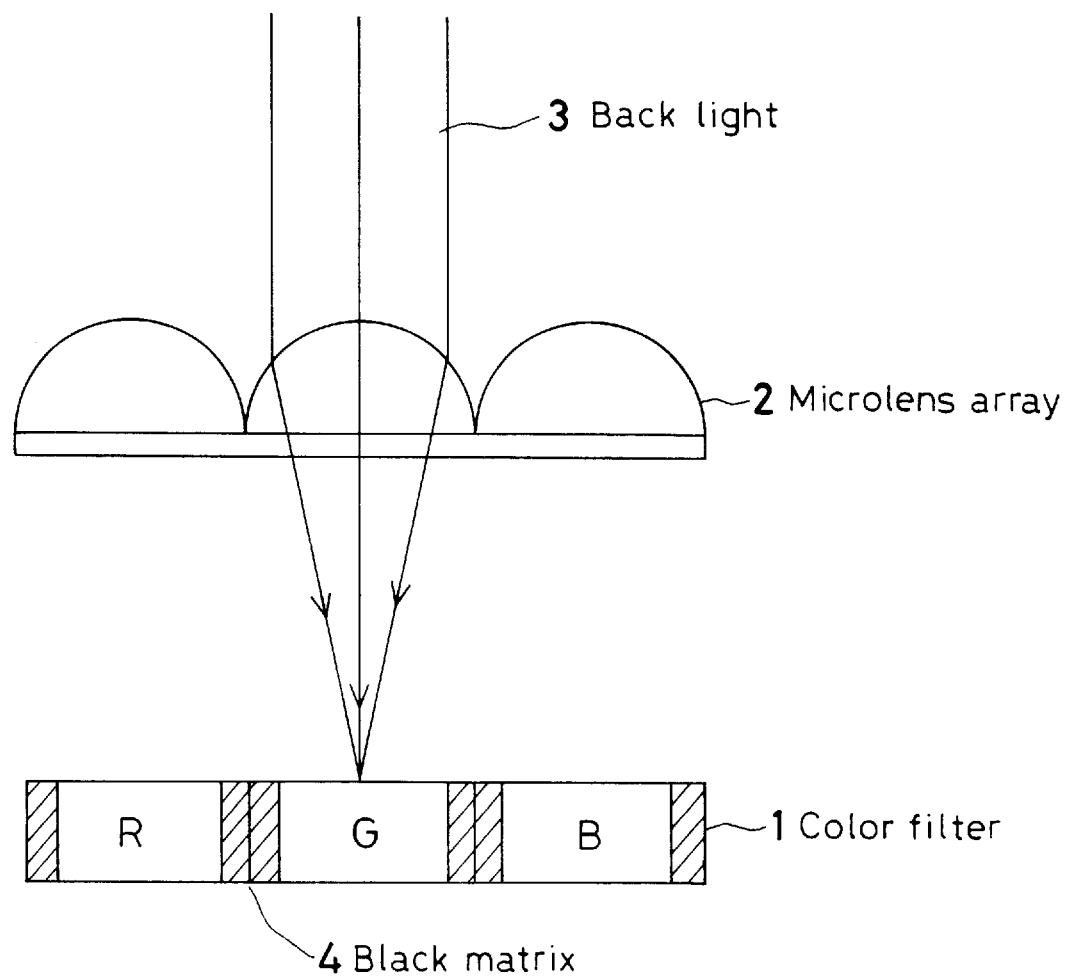
FIG. 15 shows a method of illuminating a conventional liquid crystal display apparatus.

In the above-described arrangement, not a converging hologram but a transmission hologram which comprises uniform interference fringes, and which has only slight dependence of diffraction efficiency on wavelength can be used as the hologram 7. Therefore, it is not necessary to align the hologram 7 with the microlenses 8' of the microlens array 8. In addition, the pitch of the microlens array 8 is three times that in the case of the conventional arrangement shown in FIG. 15. Accordingly, the microlens array 8 can be readily produced, and the alignment is facilitated.

Figure 2:
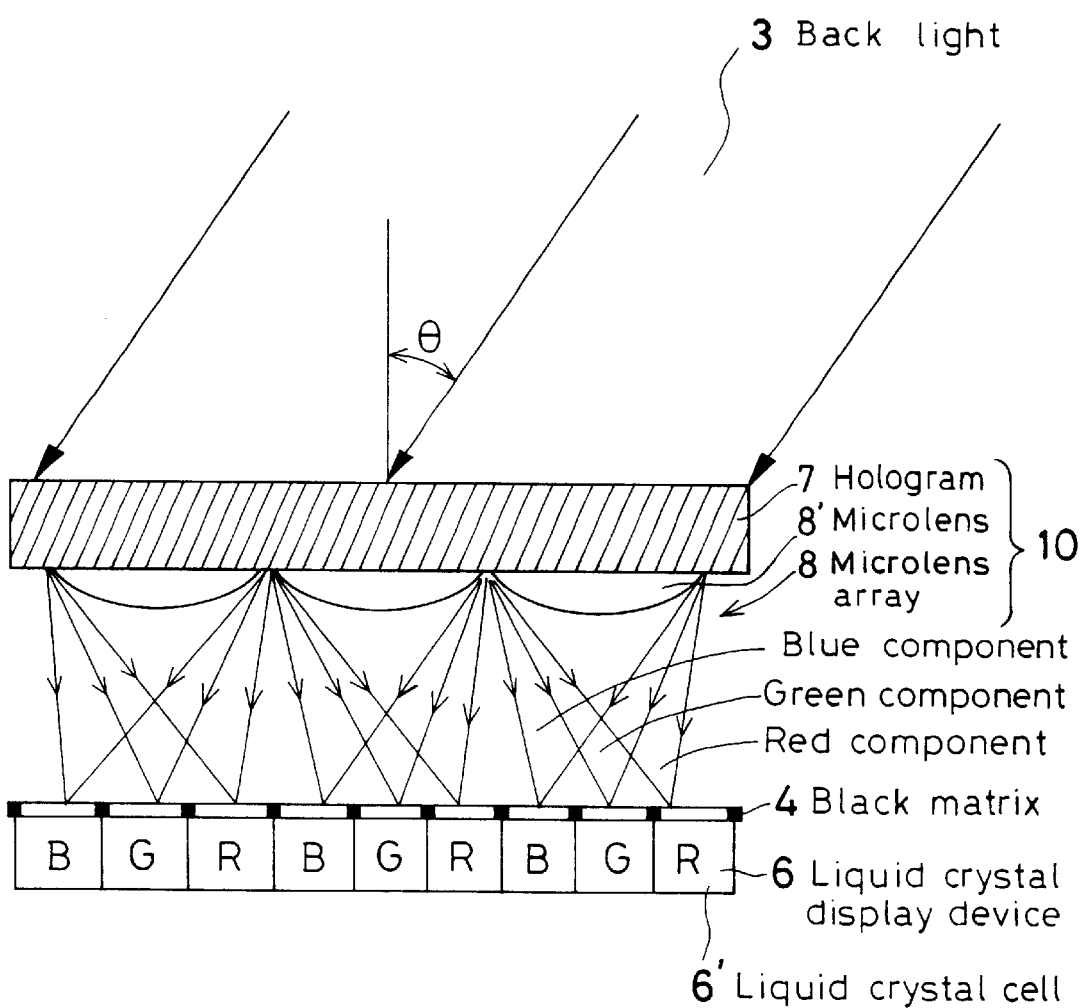
FIG. 2 is a sectional view of a liquid crystal display apparatus incorporating a second form of hologram color filter used in the present invention.
Figure 3:
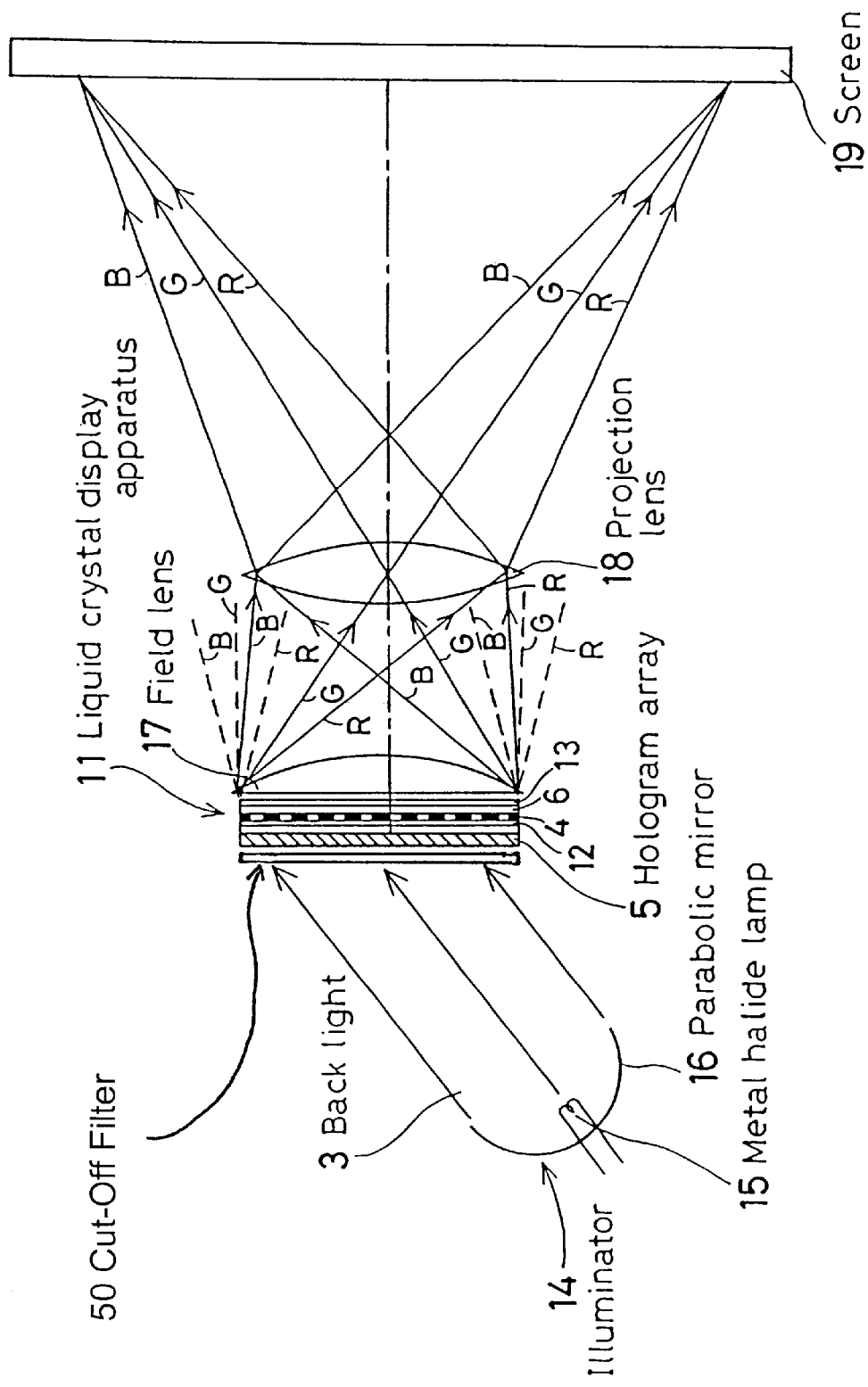
FIG. 3 is a sectional view showing the arrangement of one example of the liquid crystal projection display apparatus according to the present invention.

In the present invention, the liquid crystal display apparatus which employs a hologram color filter arranged as shown in FIG. 1 or 2 is used as it is, or as a spatial light modulator for projection display. FIG. 3 is a sectional view of a liquid crystal projection display apparatus arranged according to the present invention by using a color liquid crystal display apparatus 11, which is arranged as shown in FIG. 1, as a spatial light modulator. The liquid crystal projection display apparatus can also be arranged in the same way by using the liquid crystal display apparatus shown in FIG. 2. It should be noted that, in FIG. 3, polarizers 12 and 13 for liquid crystal display apparatus are disposed in close proximity to both sides of the liquid crystal display device 6. The polarizer 12 which is provided at the entrance side of the liquid crystal display device 6 is disposed between the hologram array 5 and the liquid crystal display device 6. The color liquid crystal display apparatus 11 is illuminated by white parallel back light 3 from an illuminator 14 which comprises a combination of a metal halide lamp 15 and a parabolic mirror 16, for example. The displayed image that is modulated in the color liquid crystal display apparatus 11 is passed through a field lens 17, which is disposed in the vicinity of the liquid crystal display apparatus 11, and formed as an enlarged image on a screen 19 by a projection lens 18. Thus, a bright projected image can be obtained.

In the above-described arrangement, the entrance-side polarizer 12 may be disposed at the entrance side of the hologram array 5 in theory. In practice, however, the hologram array 5 has birefringence which is attributable to the material (photopolymer, for example) thereof. Therefore, if illuminating light passes through the polarizer 12 and the hologram array 5 in the mentioned order, it becomes not linearly polarized light but elliptically polarized light. Accordingly, it may become impossible to give the desired modulation to the light which has passed through the polarizer 13 after passing through the liquid crystal display device 6, which has a twisted nematic liquid crystal material or the like sandwiched between a pair of transparent electrodes. For this reason, it is preferable that the polarizer 12 should be disposed between the hologram array 5 and the liquid crystal display device 6, as shown in FIG. 3.

The reason why the field lens 17 is disposed in the vicinity of the exit side of the color liquid crystal display apparatus 11 is as follows: Light rays R, G and B which have been dispersed by the hologram array 5 and passed through the liquid crystal display device 6 emanate therefrom in respective directions as shown by the broken lines in FIG. 3. Since the dispersion angle ($\alpha$ in FIG. 1) of light that is diffractively dispersed by the hologram array 5 is within ±15°, if no field lens 17 is disposed, light B which emanates from the upper end of the liquid crystal display device 6 cannot enter the projection lens 18, as will be clear from the figure. Therefore, the light B cannot contribute to the formation of the image of the color liquid crystal display apparatus 11 on the screen 19. Similarly, light R which emanates from the lower end of the liquid crystal display device 6 cannot enter the projection lens 18, and it fails to contribute to the formation of the image of the color liquid crystal display apparatus 11 on the screen 19. Consequently, the projected image undesirably becomes bluish at the upper end of the screen 19, and reddish at the lower end of the screen 19. Thus, it may become impossible to reproduce a faithful color image due to uneven color. However, if a field lens 17 is disposed immediately behind the exit side of the color liquid crystal display apparatus 11, as shown in FIG. 3, the light rays R, G and B that emanate from the liquid crystal display device 6 in the respective directions, which are shown by the broken lines in FIG. 3, are bent toward the optical axis by the field lens 17, as shown by the solid lines in the figure. As a result, both the light B that emanates from the upper end of the liquid crystal display device 6 and the light R that emanates from the lower end thereof enter the projection lens 18 to contribute to the formation of the projected image. Therefore, there is no likelihood of the projected image becoming bluish and reddish at the upper and lower ends of the screen 19. Thus, no uneven color problem occurs. Further, the field lens 17 enables an increase in the quantity of light which contributes to the formation of the projected image. Therefore, the illuminating light utilization efficiency further improves.

In a case where some color unevenness is allowable, the field lens 17 may be omitted, as a matter of course.

It should be noted that any of the following lenses may be used as the field lens 17: a cylindrical lens which has a positive refractive power at least in the direction of diffraction caused by the hologram array 5, that is, within the plane of FIG. 3; a toric lens in which the positive refractive power within the plane of FIG. 3 is larger than the positive refractive power in a direction perpendicular to the plane of the figure; an axially symmetric positive lens; and a Fresnel lens having any of the functions of these lenses. When the dispersion angle $\alpha$ of light that is diffractively dispersed by the hologram array 5 is not within about ±15°, a field lens 17 having an excessively large numerical aperture is needed in order to allow all the dispersed light to enter the projection lens 18; this is not practicable. Therefore, it is important to set the dispersion angle of the hologram array 5 within ±15°.

It should be noted that the color liquid crystal display apparatus shown in FIG. 2 may be used as the liquid crystal display apparatus 11 in the arrangement shown in FIG. 3, as a matter of course.

Figure 4:
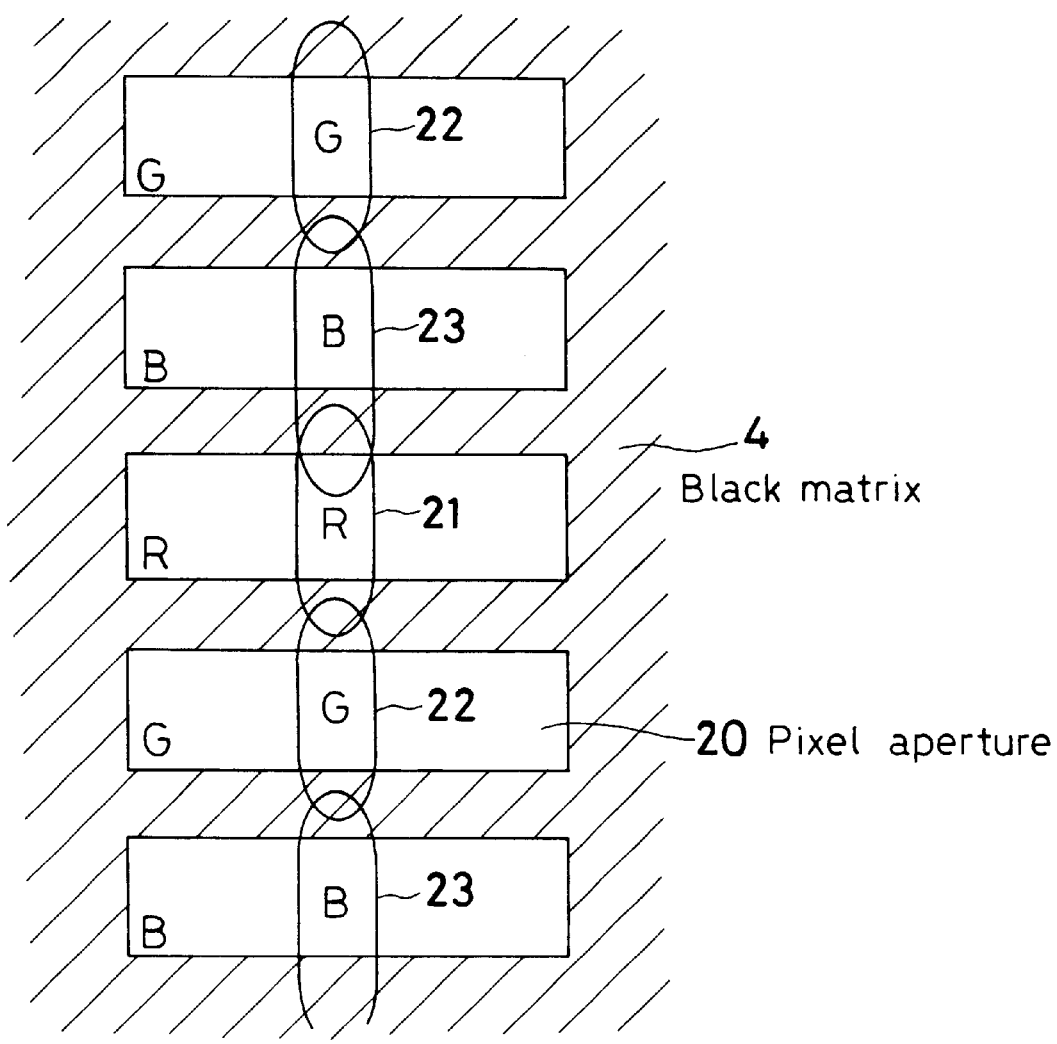
FIG. 4 is a rear view of a liquid crystal display device in FIG. 1, showing a row of pixels.

Incidentally, the liquid crystal display device 6, which is shown in FIG. 1, has pixels which are arranged as shown in FIG. 4, as viewed from the rear side of the liquid crystal display device 6. It should be noted that FIG. 4 shows the arrangement of only one row of pixels. Pixel apertures 20 have a size of 65 $\mu$m in length and 240 $\mu$m in breadth, for example. The pixel apertures 20 are regularly arranged, for example, in a grid pattern, with a black matrix 4 lying between them such that the black matrix 4 extends 35 $\mu$m between each pair of lengthwise adjacent pixel openings 20, and 60 $\mu$m between each pair of breadthwise adjacent pixel openings 20. As shown in the figure, the pixel openings 20 are regularly arranged in repeating unit each consisting of three pixels: a pixel R assigned to display red, a pixel G to display green, and a pixel B to display blue, which are disposed in the mentioned order in the direction of dispersion of light. R light 21, G light 22 and B light 23, which are dispersed by the hologram arr 5, are converged on respective lengthwise elongated region over the pixel apertures 20 of the corresponding color pixels R, G and B. However, there are cases where the B light 23, for example, reaches not only the pixel aperture 20 of the pixel B assigned to display blue but also the pixel aperture 20 of the pixel R assigned to display red, which is adjacent to the pixel B. This phenomenon occurs owing to either of two causes: the dispersion characteristics of the hologram array 5; and the parallelism of back light 3. That is, in one case, the dispersed light rays 21 to 23 are inevitably distributed as shown in FIG. 4 because of the dispersion characteristics of the hologram array 5; in another case, the distribution of the dispersed light rays 21 to 23 becomes wider than the theoretical value because the degree of parallelism of the back light 3 is unfavorably low, so that the light rays 21 to 23 undesirably enter the wrong color pixels, which are adjacent to the corresponding color pixels. In any case, if there is such crosstalk of display colors, the color of the displayed image becomes dull, making it impossible to display a faithful color image.

Figure 5:
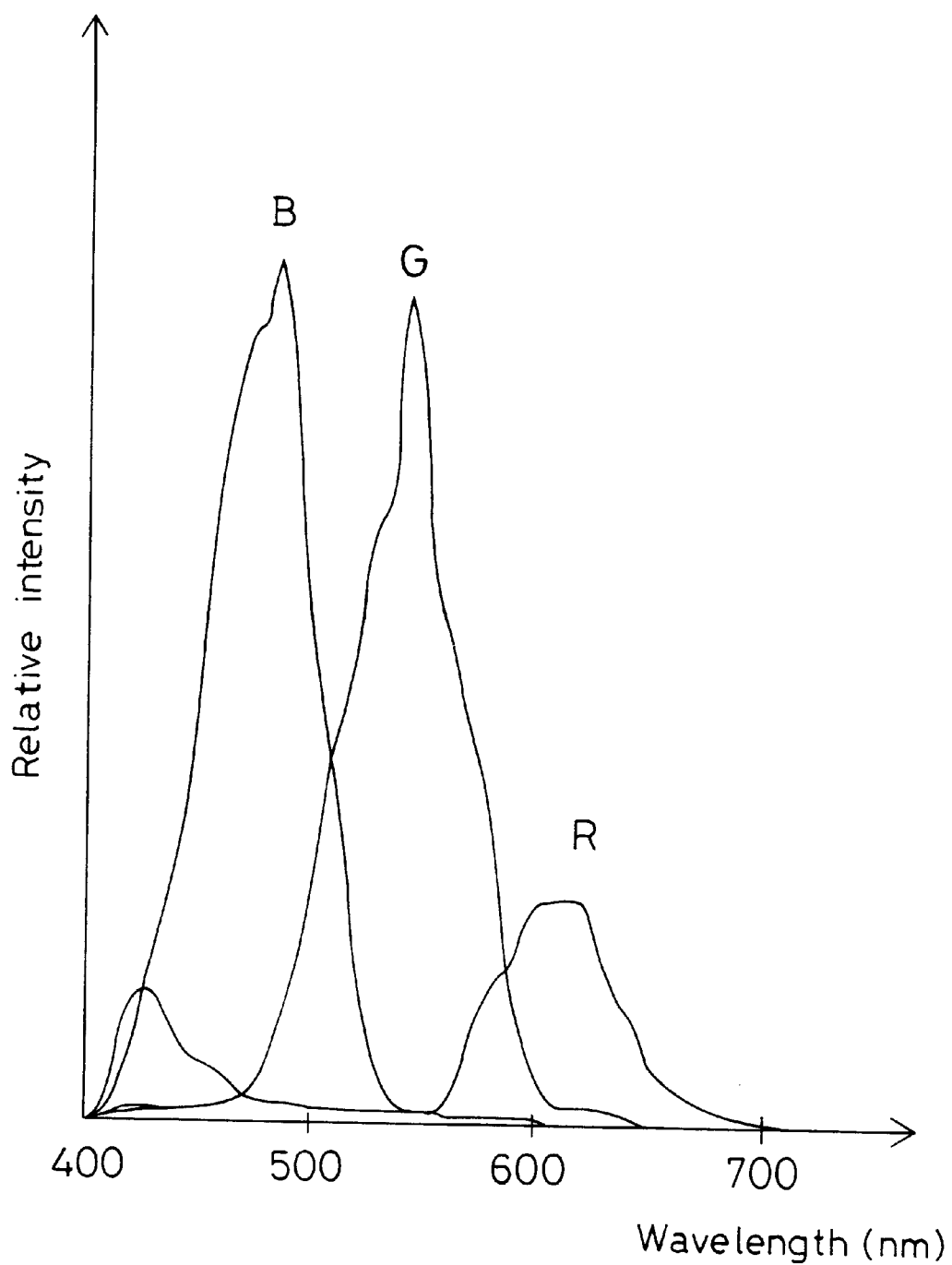
FIG. 5 is a graph showing one example of the wavelength distribution of light incident on each of pixels divided according to colors.
Figure 6:
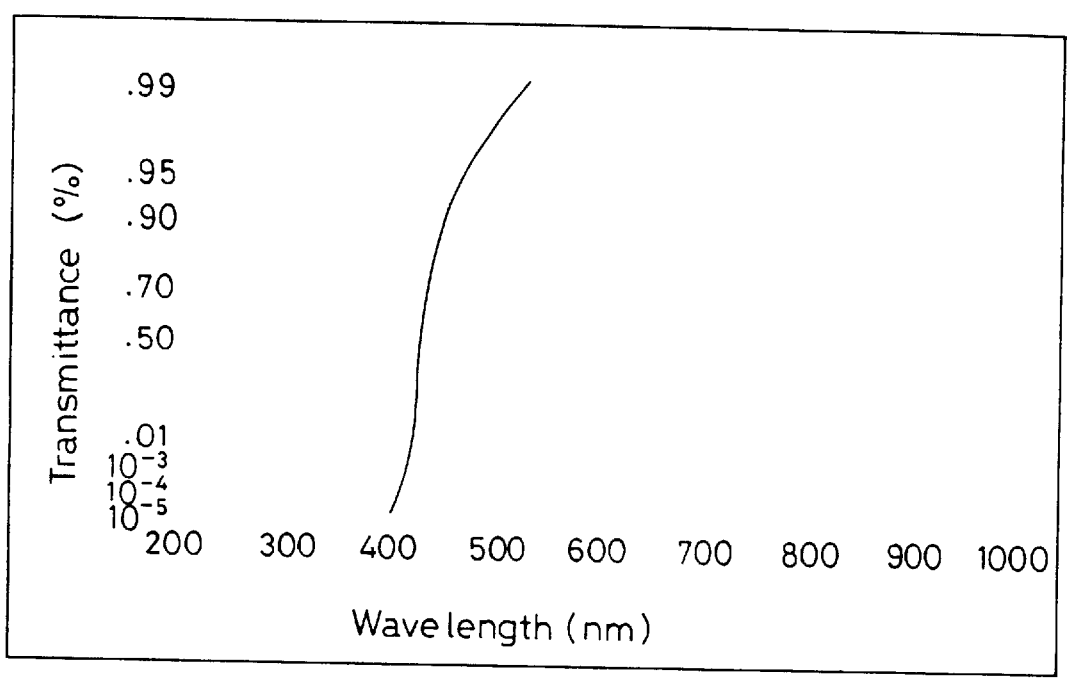
FIG. 6 is a graph showing one example of transmittance characteristics of a short-wavelength cut-off filter.

For example, FIG. 5 shows the wavelength distribution of each of light rays R, G and B incident on the pixels G, B and R, which are assigned to display red, green and blue, respectively, in the arrangement shown in FIG. 4. As will be clear from the graph of FIG. 5, the wavelength distribution of the light R incident on the pixel R, which is assigned to display R, has not only the wavelength of red but also a small peak in the wave band of blue. The peak is due to the incidence of the dispersed B light 23 on the pixel R. Therefore, in this case, a short-wavelength cut-off filter whose transmittance for a wavelength not longer than 430 nm is not higher than 5%, as shown in FIG. 6, is provided at any position in the optical path extending from the lamp 15 to the screen 19 in FIG. 3, thereby preventing crosstalk of colors which might otherwise occur when light which should be incident on a pixel B originally assigned to display blue enters a pixel R which is adjacent to the pixel B. Thus, it becomes possible to display a faithful color image.

An illustration of a cut-off filter (50) is found in FIG. 3.

Although in the foregoing a short-wavelength cut-off filter whose transmittance for a wavelength not longer than 430 nm is not higher than 5% is used to prevent crosstalk between blue and red colors, which might otherwise occur when light which should be incident on a pixel B assigned to display blue enters a pixel R which is adjacent to the pixel B, it should be noted that crosstalk between blue and red colors can occur when light which should be incident on a pixel R assigned to display red enters a pixel B which is adjacent to the pixel R, for the same reason as the above. To prevent such crosstalk, a long-wavelength cut-off filter whose transmittance for a wavelength of not shorter than 660 nm is not higher than 5% should be provided at any position in the optical path extending from the lamp 15 to the screen 19 in FIG. 3.

There is also a possibility of color crosstalk occurring between pixels B and G or between pixels G and R in FIG. 4 for the same reason as the above. To prevent crosstalk between pixels B and G, a band cut-off filter which cuts off light in the wavelength range of from 490 nm to 510 nm should be provided at any position in the optical path extending from the lamp 15 to the screen 19 in FIG. 3. To prevent crosstalk between pixels G and R, a band cut-off filter which cuts off light in the wavelength range of from 570 nm to 590 nm should be provided at any position in the optical path extending from the lamp 15 to the screen 19 in FIG. 3. It should be noted that, as a filter that cuts off light in the desired band, for example, a holographic reflection filter which employs a Lippmann hologram (volume hologram) may be used. This filter is formed by allowing coherent light beams to enter a volume hologram recording medium, e.g. a photopolymer, from opposite directions to thereby record Bragg grating patterns at a predetermined grating interval. The filter reflects only light of a predetermined wavelength which is determined by the grating interval, thereby removing the light of the predetermined wavelength from the incident light.

If two or more of the above-described filters, i.e. a short-wavelength cut-off filter, a long-wavelength cut-off filter, and a band cut-off filter, are used in combination, the color reproducibility is further improved.

It should be noted that even in a case where various filters such as those described above are used, if a component of the back light 3 which is at an angle within ±6° with respect to the travel direction of the back light 3 accounts for less than 80% because of the aggravation of the parallelism of the back light 3, the direction of light diffracted by the hologram array 5 is disordered to such an extent that color crosstalk cannot satisfactorily be prevented by these filters. Accordingly, the back light 3 must have such a degree of parallelism that a component of the back light 3 which is at an angle within ±6° with respect to the travel direction of the back light 3 accounts for not less than 80%.

Figure 7:
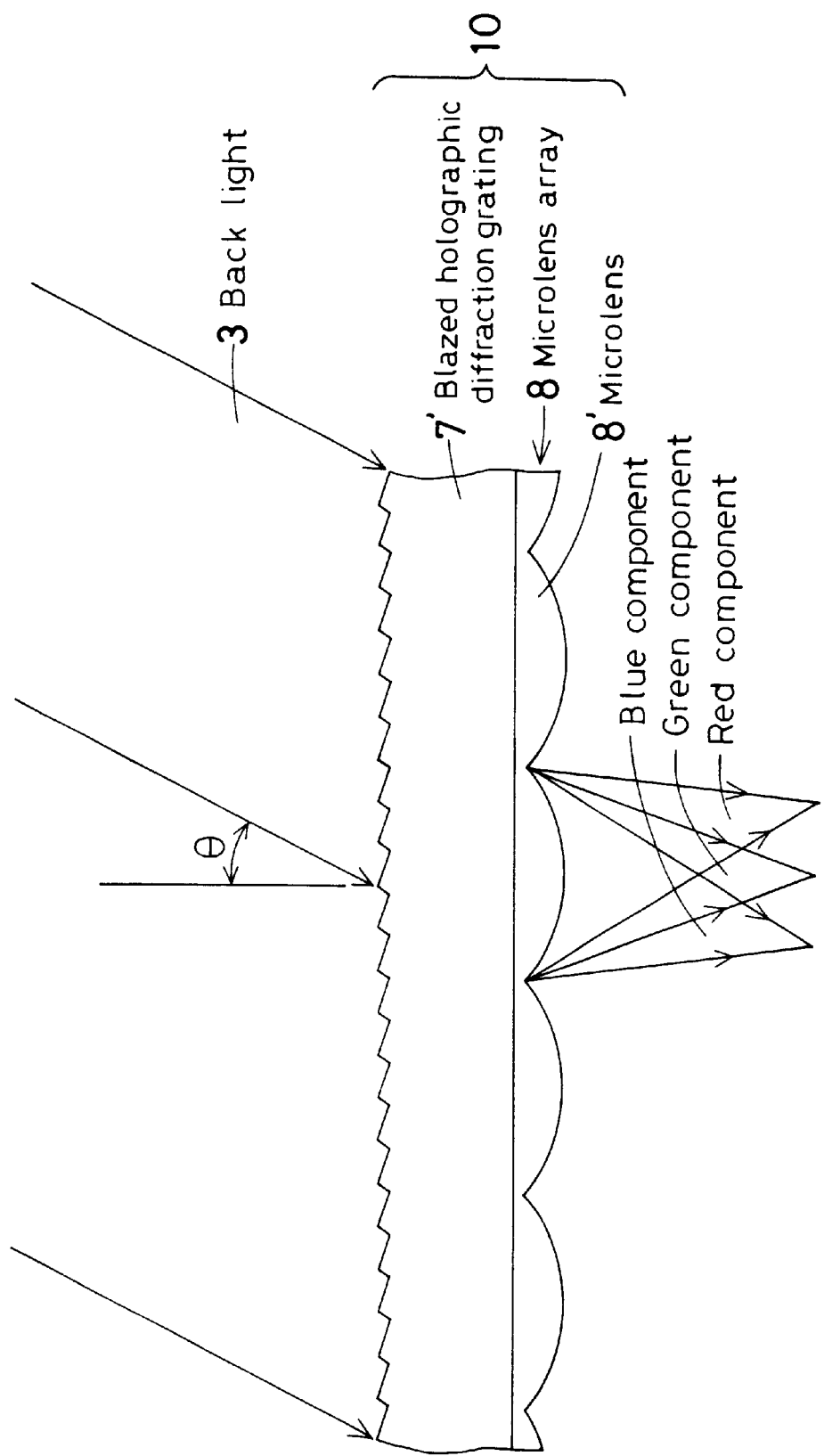
FIG. 7 is a fragmentary sectional view of a blazed holographic diffraction grating used as the hologram shown in FIG. 2.

In a case where the color liquid crystal display apparatus 11 uses a color filter 10 having, as shown in FIG. 2, a transmission hologram 7 which comprises uniform interference fringes, and which has no or only slight dependence of diffraction efficiency on wavelength, and a microlens array 8, if the hologram 7 is a relief type hologram which is arranged in the form of a blazed holographic diffraction grating 7', as shown in FIG. 7, diffracted light can be concentrated only on a specific order of diffraction, for example, +1st order of diffraction. Accordingly, a brighter color projected image can be formed.

It should be noted that the blazed holographic diffraction grating 7' may be produced, for example, by the method disclosed in Japanese Patent Application Post-Examination Publication No. 55-40846. According to the disclosed method, a relief diffraction grating is holographically formed on the surface of a photoresist, and an ion beam is made incident on the photoresist surface at right angles to the grating and at an angle to the diffraction grating surface. Thus, one side of each ridge of the relief grating is cut flat by reactive ion beam etching, thereby preparing a master, and the master is duplicated by injection molding or other similar process.

The present invention will be described below by way of another embodiment in which the hologram array 5 shown in FIG. 1 is used as a color filter for a color liquid crystal display apparatus. It should be noted that the present invention can be similarly applied in a case where the color filter 10 shown in FIG. 2 is used in the embodiment described below.

Figure 8:
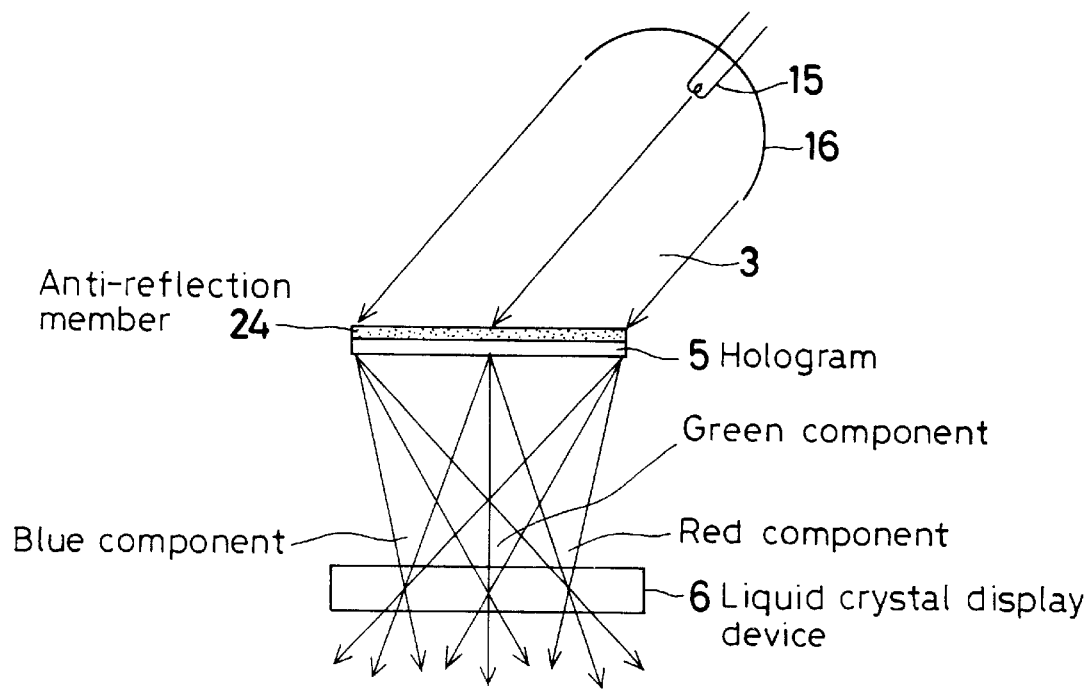
FIG. 8 shows an arrangement in which a hologram color filter is provided with an anti-reflection member.

Incidentally, when back light 3 is incident on a hologram color filter 5 such as that shown in FIG. 1, a part of the incident light is reflected by the hologram surface, resulting in a reduction of the light utilization efficiency. Therefore, as shown in FIG. 8, an anti-reflection member 24 for the back light 3 is provided on the surface of the hologram color filter 5, thereby improving the light utilization efficiency (see Japanese Patent Application No. 5-234500). It should be noted that, in the arrangement shown in FIG. 8, the back light 3 is formed by reflecting light from a metal halide lamp 15 by a parabolic mirror 16.

Figure 9:
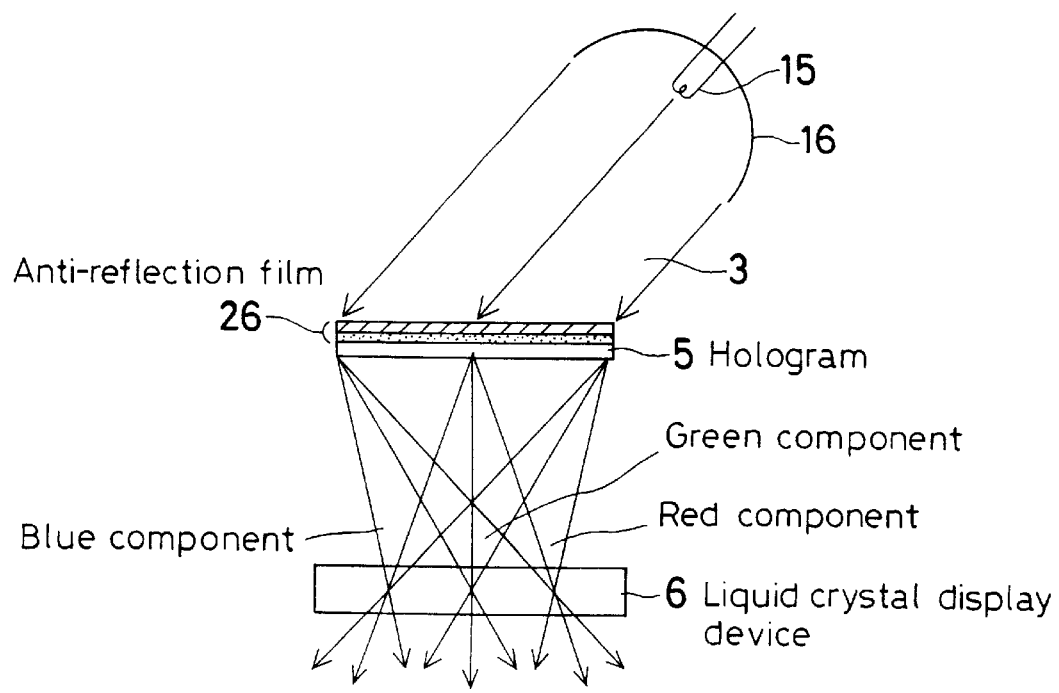
FIG. 9 shows an arrangement in which an anti-reflection film is provided as an anti-reflection member.
Figure 10:
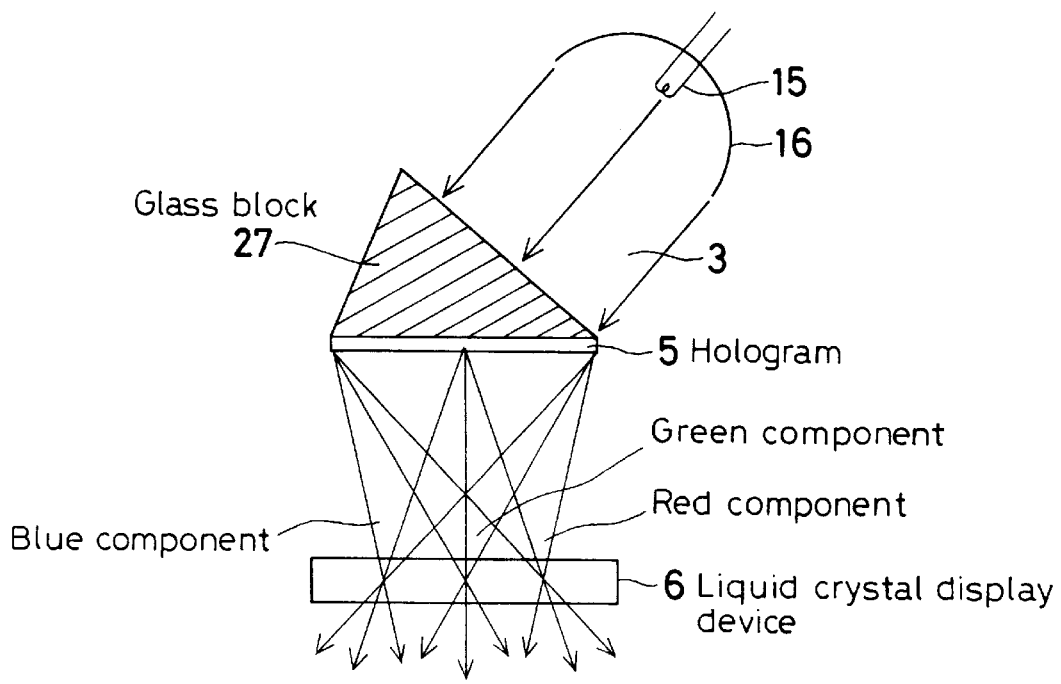
FIG. 10 shows an arrangement in which a glass block is provided as an anti-reflection member.
Figure 11:
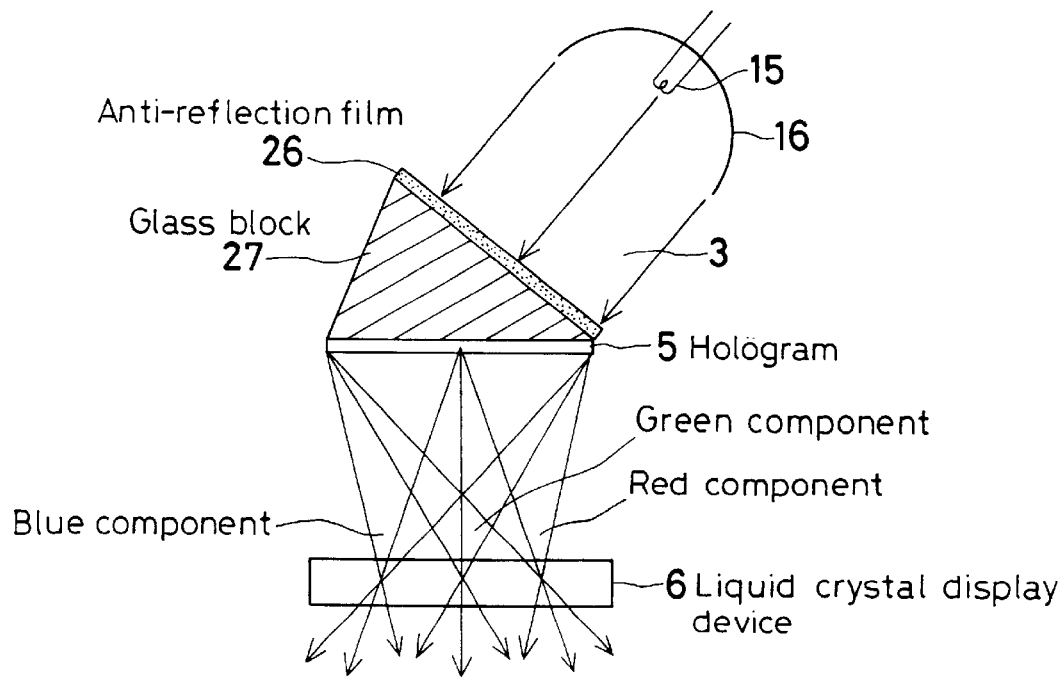
FIG. 11 shows an arrangement in which an anti-reflection film is provided on the entrance side of the glass block shown in FIG. 10.

Examples of the anti-reflection member 24 include those which are shown in FIGS. 9 to 11. In FIG. 9, an anti-reflection film 26 is provided on the surface of the hologram optical element 5. In FIG. 10, a glass block 27 having an entrance-side surface perpendicular to the incident light 3 is provided on the surface of the hologram optical element 5 (if the light 3 is incident on the entrance-side surface at approximately right angles to it, the reflected component can be reduced). In FIG. 11, the glass block 27 is provided on the surface of the hologram optical element 5, and the anti-reflection film 26 is provided on the entrance-side surface of the glass block 27. The anti-reflection film 26 may be provided directly on the surface of the hologram optical element 5. Alternatively, a glass plate which has the anti-reflection film 26 provided on the surface thereof may be disposed over the surface of the hologram optical element 5 with an index matching liquid interposed therebetween.

It should be noted that the anti-reflection film 26 comprises either a single layer or a stack of thin films, and it is formed by depositing a film having a desired refractive index to a predetermined thickness on a substrate by vacuum deposition or other similar method. For example, when an anti-reflection film comprising a single layer is to be formed on a substrate, a thin film of a low-refractive index material, e.g. $MgF_2$ or $SiO_2$, is formed as a single-layer anti-reflection film on the substrate by setting the optical film thickness d at $nd=\lambda/4$ (where $\lambda$ is the design wavelength, which is in the range of from 500 nm to 580 nm) in relation to the refractive index n. When the anti-reflection film 26 is to be formed as a double-layer film, first, a thin film of a high-refractive index material, e.g. $TiO_2$, $ZrO_2$ or $In_2O_3$, is formed on a substrate by setting the optical film thickness $d_1$ at $n_1 d_1 = \lambda/2$ (where $\lambda$ is the design wavelength, which is in the range of from 500 nm to 580 nm) in relation to the refractive index $n_1$ of the thin film material. Next, a low-refractive index thin film is stacked on the high-refractive index thin film in the same way as in the case of the above-described single-layer anti-reflection film 26, thereby forming a double-layer film. It should be noted that, in the case of an anti-reflection film 26 comprising three or more layers also, first, a thin film having a high refractive index is formed on a substrate, and then a thin film of an intermediate-refractive index material, e.g. $Al_2O_3$, MgO or $Y_2O_3$, is formed on the high-refractive index thin film. Thereafter, the above-described low-refractive index thin film is stacked on the intermediate-refractive index thin film. Thus, in any of the above cases, the uppermost layer of the anti-reflection film 26 is formed from a low-refractive index thin film.

According to another aspect of the present invention, a hologram optical element, which includes a hologram color filter, a glass substrate, a glass block, an anti-reflection film and a polarizing film, as described above, and a liquid crystal panel member, which is prepared by an existing production process, are prepared in respective processes, and the two members are integrated into a liquid crystal display apparatus in the final process. By using such an integrating process, the liquid crystal display apparatus employing a hologram color filter according to the present invention can be produced without modifying the existing color liquid crystal display apparatus manufacturing process to a considerable extent. Upon completion of the hologram optical element and the liquid crystal panel, these two members are integrated with each other by using an optical adhesive or the like.

The liquid crystal display apparatus employing a hologram color filter according to the present invention, together with a method of producing it, will be explained below by way of a specific example.

First, the hologram color filter producing process will be explained. By using Omnidex 352 (photopolymer manufacture by Du Pont Co., Ltd.) as hologram recording film, a multiplicity of transmission holograms were produced by optical contact duplicating process using an original plate for duplication of a hologram array such as the hologram array 5 shown in FIG. 1, which was produced by using a computer generated hologram (CGH) as an original plate. For the duplication, an argon laser manufactured by Spectra Physics, Model SP2020-5w (oscillation wavelength: 514 nm), was used.

Thereafter, the film was irradiated with ultraviolet radiation so that the amount of exposure per unit area was about 100 mJ/cm². Subsequently, the film was heated for 120 minutes at 120° C.

The film having a multiplicity of hologram color filters thus recorded thereon in parallel was punched out for each hologram region, and processed to a sheet-like form.

Figure 12:
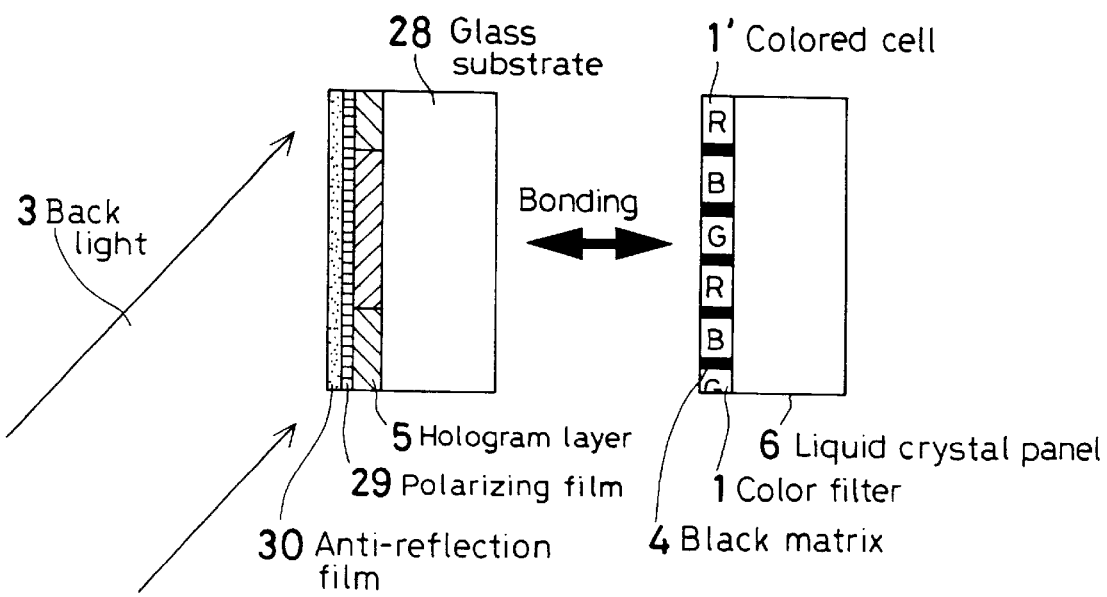
FIG. 12 shows the sequence of assembling a liquid crystal display apparatus employing a hologram color filter according to the present invention.
Figure 13:
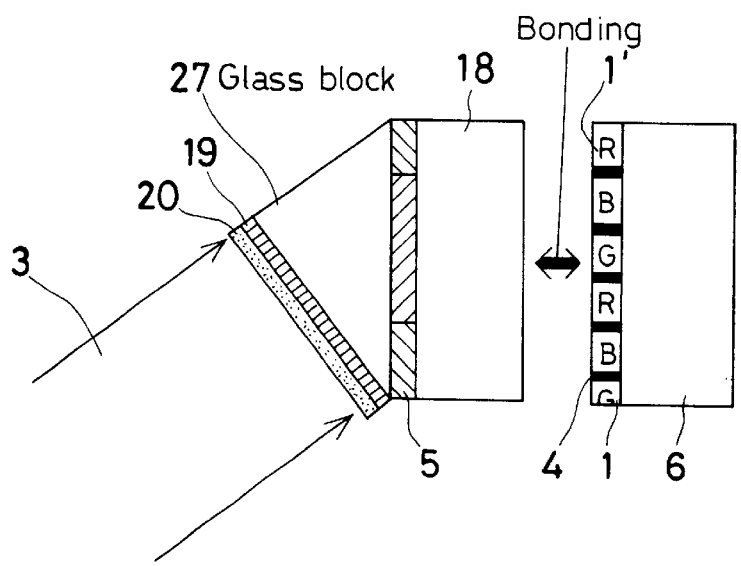
FIG. 13 shows the sequence of assembling another liquid crystal display apparatus according to the present invention.

Next, as shown in FIGS. 12 and 13, the hologram sheet 5 thus produced was bonded to the surface of a glass substrate 28 with an optical adhesive (product number: NOA-61, manufactured by Noland U.S.A.) interposed therebetween. Then, as shown in FIG. 12, a polarizing film 29 and an anti-reflection film 30 were successively bonded to the surface of the hologram sheet 5 in the mentioned order with the same optical adhesive as the above interposed therebetween by using a roller. In another example, as shown in FIG. 13, a glass block 27 (see FIGS. 10 and 11) was first bonded to the hologram sheet 5 with the same optical adhesive as the above interposed therebetween, and a polarizing film 29 and an anti-reflection film 30 were successively bonded to the entrance-side surface of the glass block 27 in the mentioned order in the same way as the above. The optical adhesive was cured by irradiation with ultraviolet rays from an ultraviolet lamp at 1,000 mJ/cm².

The polarizing film 29 is a polarizing element essential for a liquid crystal display apparatus; it serves as a polarizing element on the entrance side of the liquid crystal panel 6. It should be noted that, unlike the polarizing element in the arrangement shown in FIG. 3, the polarizing element 29 in this embodiment is disposed on the back light entrance side of the hologram color filter 5.

Regarding the direction of polarization of the polarizing element 29, it is desirable in the above-described arrangement to select a direction of polarization of the polarizing film 29 so that illuminating light becomes s-polarized light with respect to the back light 3 of the liquid crystal display apparatus finally completed. The reason for this is as follows:

According to Kogelnik's formula (H. Kogelnik "Coupled Wave Theory for Thick Hologram Gratings" Bell Syst. Tech., J. 48,2909 (1969)), the diffraction efficiency $\eta$ of the transmission hologram 5 under the Bragg conditions is given by $$\eta = \sin^2 v \tag{1}$$

With regard to $v$, the value $v_s$ for s-polarized light is given by $$v_s = \pi \Delta n d / \{\lambda(\cos\theta \cos\theta_s)^{1/2}\} \tag{2}$$

The value $v_p$ for p-polarized light is given by $$v_p = v_s \cos\{2(\phi-\theta)\} \tag{3}$$

(for example, see the above-mentioned "SPIE" vol.1507, pp.426–434 (1991))

Reference symbols in the above expressions are as follows: d is the effective thickness of a portion of the hologram 5 where interference fringes have been recorded; $\lambda$ is the wavelength of incident light; $\Delta n$ is the refractive index modulation by the interference fringes with respect to the mean refractive index n of the medium of the hologram 5; $\phi$ is the angle of the line normal to the interference fringes with respect to the line normal to the hologram 5; $\theta$ is the angle which is made inside the hologram 5 by incident light on the interference fringes with respect to the line normal to the hologram 5; and $\theta_s$ is the angle which is made inside the hologram 5 by first-order light Bragg-diffracted by the interference fringes with respect to the line normal to the hologram 5.

It will be clear from the above expressions (1) to (3) that the diffraction efficiency $\eta$ of the hologram 5 for linearly polarized light is higher in the case of s-polarized light than in the case of p-polarized light. In the case of s-polarized light, therefore, the back light utilization efficiency becomes higher, and the proportion of zeroth-order light, which travels straight without being diffracted, reduces. Accordingly, it is possible to reduce the proportion of zeroth-order diffracted light, which becomes stray light without being dispersed.

Figure 14:
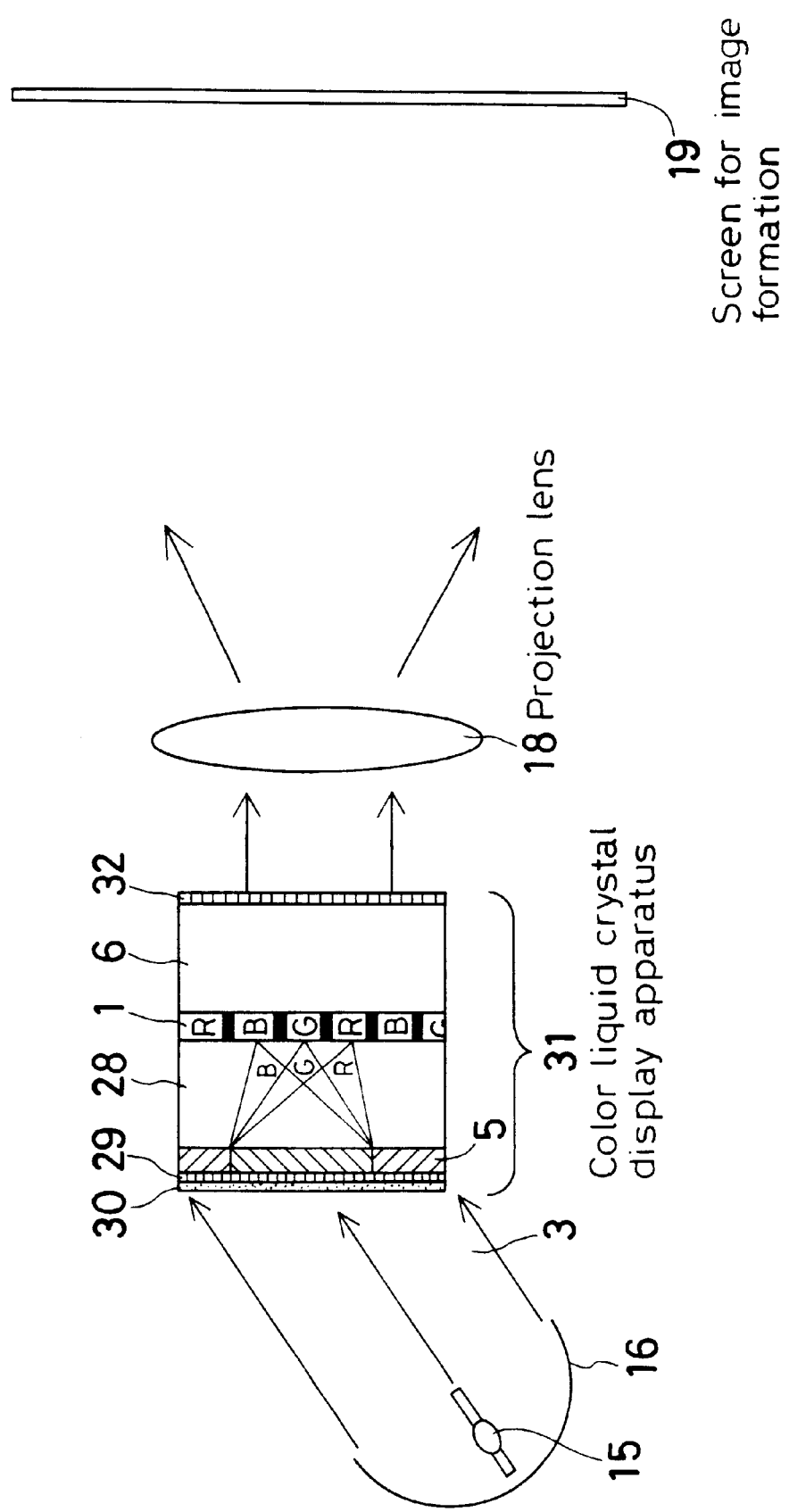
FIG. 14 shows the arrangement of a liquid crystal projector which employs a liquid crystal display apparatus of the present invention.

Next, the hologram optical element produced as described above is integrally bonded to the entrance side of a liquid crystal panel 6 comprising a black matrix, a liquid crystal layer, TFTs, an electrically conductive layer (ITO), etc., which has been prepared in another process (in the arrangements shown in FIGS. 12 and 13, a color filter 1 comprising colored cells 1' and a black matrix 4, which is provided to lie between the cells 1', is provided on the entrance side of the liquid crystal panel 6) by using an optical adhesive (product number: NOA-61, manufactured by Noland U.S.A.), as shown in FIGS. 12 and 13. It should be noted that, as shown in FIG. 14, another polarizing element 32 is integrally bonded to the exit side of the liquid crystal panel 6. In the above-described final process, the hologram optical element and the liquid crystal panel 6 must be bonded to each other so that the pixels of the hologram 5 provided on the hologram optical element are in register with the pixels defined by the black matrix 4 provided on the liquid crystal panel 6. To attain the registering, register markers are previously provided on the two substrates. The hologram color filter which was integrated with the liquid crystal panel 6 after the markers had been made coincident with each other was able to obtain satisfactory alignment accuracy.

By employing the above-described method, a liquid crystal panel can be produced without greatly modifying the existing production line for a liquid crystal display apparatus, particularly, a liquid crystal display apparatus for a liquid crystal projector such as that shown in FIG. 14. Referring to FIG. 14, a color liquid crystal display apparatus 31 integrated with the hologram color filter 5 as described above is illuminated by a back light source which comprises a metal halide lamp 15 and a parabolic mirror 16, and a color image displayed by the color liquid crystal display apparatus 31 is projected as an enlarged image on a screen 19 for image formation by a projection lens 18. In this way, an enlarged color image is displayed for the observer.

Incidentally, the hologram color filter 5 should preferably be disposed on the back light entrance side of the glass substrate 28 rather than on the side of the glass substrate 28 which is closer to the liquid crystal panel 6. The reason for this is as follows: It has been experimentally proved that, as the incident angle of light on an ordinary, commercially available glass substrate 28 becomes larger, the polarization characteristics of light passing through the glass substrate 28 are disordered to a larger extent, so that the plane of polarization of the incident light cannot completely be preserved. Accordingly, in a case where the hologram color filter 5 is disposed on the back light entrance side of the glass substrate 28, component colored rays of light diffracted by the hologram color filter 5 enter the glass substrate 28 at an incident angle smaller than the incident angle θ of the back light 3, that is, from a direction closer to the line normal to the glass substrate 28. Therefore, light passing through the glass substrate 28 has minimal disorder of the polarization characteristics caused by the anisotropy of the glass substrate 28, and thus the plane of polarization of the incident light can be substantially preserved. Accordingly, when only light polarized in a predetermined direction is extracted by the polarizing element 32 to display a desired color pattern after the incident light has passed through the liquid crystal display device 6 as a polarization plane modulating element, leakage light is minimized, and thus reduction of contrast can be prevented.

Although the liquid crystal display apparatus and liquid crystal projection display apparatus according to the present invention have been described above by way of embodiments, it should be noted that the present invention is not necessarily limited to the described embodiments, and that various changes and modifications may be imparted thereto.

As will be clear from the foregoing description, in the liquid crystal display apparatus and first liquid crystal projection display apparatus, which employ a hologram color filter, according to the present invention, a hologram which diffractively disperses incident light so as to emanate light rays in different wavelength regions at a predetermined spatial period is used as a color filter for a color liquid crystal display device, and a cut-off filter whose transmittance for light in a desired wavelength region is not higher than 5% is disposed in an optical path which extends from a light source to a screen or to an observation position. Therefore, the illuminating light utilization efficiency in the projection apparatus can be improved to a considerable extent, and it is possible to prevent crosstalk of colors, e.g. blue and red, and to display or project a color image faithfully with excellent color reproducibility.

In the second liquid crystal projection display apparatus employing a hologram color filter according to the present invention, a hologram which diffractively disperses incident light so as to emanate light rays in different wavelength regions at a predetermined spatial period is used as a color filter for a color liquid crystal display device, and a field lens is disposed in the vicinity of the exit side of the color liquid crystal display device. Therefore, the illuminating light utilization efficiency in the projection apparatus can be improved to a considerable extent, and it is possible to project a color image faithfully with excellent color reproducibility without uneven color or other similar problem.

What we claim is:

1. A liquid crystal display apparatus comprising:
   a hologram which diffractively disperses incident light so as to emanate light rays in different wavelength regions at a predetermined spatial period, said hologram being used as a color filter for a color liquid crystal display device having a surface; and
   a cut-off filter that optically covers the entire surface of the display device whose transmittance for light in a desired wavelength region is not higher than 5% such that a color image can be faithfully displayed with excellent color reproducibility, said cut-off filter being disposed in an optical path which extends from a light source to an observation position.

2. A liquid crystal projection display apparatus according to claim 1, further comprising:
   a cut-off filter whose transmittance for light in a desired wavelength region is not higher than 5%, said cut-off filter being disposed in an optical path which extends from a light source to said screen.

3. A liquid crystal projection display apparatus according to claim 2, wherein said cut-off filter is a short-wavelength cut-off filter whose transmittance for a wavelength not longer than 430 nm is not higher than 5%.

4. A liquid crystal projection display apparatus according to claim 1, wherein said hologram is disposed at a position which is closer to said light source than a polarizer which is provided at an entrance side of said color liquid crystal display device.

5. A liquid crystal projection display apparatus in which an image displayed on a color liquid crystal display device is projected on a screen as an enlarged image by a projection optical system, said apparatus comprising:
   a hologram which diffractively disperses incident light so as to emanate light rays in different wavelength regions at a predetermined spatial period, said hologram being used as a color filter for said color liquid crystal display device having a surface; and
   a cut-off filter that optically covers the entire surface of the display device whose transmittance for light in a desired wavelength region is not higher than 5% such that a color image can be faithfully displayed with excellent color reproducibility, said cut-off filter being disposed in an optical path which extends from a light source to said screen.

6. A liquid crystal projection display apparatus according to claim 5, wherein said cut-off filter is a short-wavelength cut-off filter whose transmittance for a wavelength not longer than 430 nm is not higher than 5%.

7. A liquid crystal projection display apparatus according to claim 5, wherein said hologram is disposed at a position which is closer to said light source than a polarizer which is provided at an entrance side of said color liquid crystal display device.

8. A liquid crystal projection display apparatus according to claim 5, wherein illuminating light for said hologram has such a degree of parallelism that a component of the light which is at an angle within ±6° with respect to a travel direction of the illuminating light accounts for not less than 80%.

9. A liquid crystal projection display apparatus according to claim 5, wherein a dispersion angle of said hologram is within ±15°.

10. A liquid crystal projection display apparatus according to claim 5, wherein said hologram has both a dispersing function and a converging function.

* * * * *